United States Patent
Maeda

(10) Patent No.: US 10,797,343 B2
(45) Date of Patent: Oct. 6, 2020

(54) BINDER FOR ALL-SOLID-STATE SECONDARY BATTERIES, AND ALL-SOLID-STATE SECONDARY BATTERY

(71) Applicant: ZEON CORPORATION, Chiyoda-ku, Tokyo (JP)

(72) Inventor: Kouichirou Maeda, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 194 days.

(21) Appl. No.: 15/753,653

(22) PCT Filed: Aug. 31, 2016

(86) PCT No.: PCT/JP2016/075386
§ 371 (c)(1),
(2) Date: Feb. 20, 2018

(87) PCT Pub. No.: WO2017/047379
PCT Pub. Date: Mar. 23, 2017

(65) Prior Publication Data
US 2018/0254520 A1 Sep. 6, 2018

(30) Foreign Application Priority Data
Sep. 16, 2015 (JP) ................ 2015-182634

(51) Int. Cl.
| | | |
|---|---|---|
| *H01M 10/0562* | (2010.01) | |
| *H01M 4/62* | (2006.01) | |
| *H01M 10/052* | (2010.01) | |
| *H01M 10/0565* | (2010.01) | |

(52) U.S. Cl.
CPC ........ *H01M 10/0562* (2013.01); *H01M 4/62* (2013.01); *H01M 4/622* (2013.01); *H01M 10/052* (2013.01); *H01M 10/0565* (2013.01); *H01M 2300/0082* (2013.01)

(58) Field of Classification Search
None
See application file for complete search history.

(56) References Cited

U.S. PATENT DOCUMENTS

| | | |
|---|---|---|
| 2002/0034686 A1 | 3/2002 | Yamakawa et al. |
| 2013/0040206 A1 | 2/2013 | Yoshida et al. |
| 2014/0127579 A1* | 5/2014 | Yoshida ............. H01B 1/122 429/217 |
| 2015/0050554 A1* | 2/2015 | Fukumine ........ H01M 4/0404 429/217 |
| 2016/0204468 A1 | 7/2016 | Makino et al. |

FOREIGN PATENT DOCUMENTS

| | | |
|---|---|---|
| JP | S59151770 A | 8/1984 |
| JP | 4134617 B2 | 8/2008 |
| JP | 2009176484 A | 8/2009 |
| JP | 2009211950 A | 9/2009 |
| JP | 2013008611 A | 1/2013 |
| JP | 2015088480 A | 5/2015 |
| WO | 2011105574 A1 | 9/2011 |
| WO | 2012173089 A1 | 12/2012 |

OTHER PUBLICATIONS

Nov. 22, 2016, International Search Report issued in the International Patent Application No. PCT/JP2016/075386.
Mar. 20, 2018, International Preliminary Report on Patentability issued in the International Patent Application No. PCT/JP2016/075386.
Apr. 4, 2019, the Extended European Search Report issued by the European Patent Office in the corresponding European Patent Application No. 16846250.5.

* cited by examiner

*Primary Examiner* — Christopher P Domone
(74) *Attorney, Agent, or Firm* — Kenja IP Law PC

(57) ABSTRACT

This binder for all-solid-state secondary batteries contains a binder polymer which is obtained by polymerizing or copolymerizing a monomer composition that contains a polyalkylene oxide-based monomer.

3 Claims, No Drawings

BINDER FOR ALL-SOLID-STATE SECONDARY BATTERIES, AND ALL-SOLID-STATE SECONDARY BATTERY

TECHNICAL FIELD

The present invention relates to a binder for all-solid-state secondary batteries which can be used for an all-solid-state lithium ion secondary battery or the like.

BACKGROUND ART

In recent years, demand for a secondary battery such as a lithium ion battery has been increasing in a variety of applications such as a domestic small power storage device, an electric motorcycle, an electric vehicle, and a hybrid electric vehicle in addition to a portable terminal such as a portable information terminal or a portable electronic device.

With spread of the applications, further improvement of safety of a secondary battery is required. In order to ensure safety, a method for preventing liquid leakage, and a method for using a solid electrolyte in place of a combustible organic solvent electrolyte are useful.

As the solid electrolyte, a polymer solid electrolyte using polyethylene oxide or the like is known (Patent Literature 1). However, the polymer solid electrolyte is a combustible material. As the solid electrolyte, an inorganic solid electrolyte formed of an inorganic material has been also proposed (Patent Literature 2 or the like). An inorganic solid electrolyte is a solid electrolyte formed of an inorganic substance and is a non-combustible material as compared with a polymer solid electrolyte, and has very high safety as compared with an organic solvent electrolyte usually used. As described in Patent Literature 2, development of an all-solid-state secondary battery with high safety using an inorganic solid electrolyte is progressing.

An all-solid-state secondary battery includes an inorganic solid electrolyte layer as an electrolyte layer between a positive electrode and a negative electrode. Patent Literatures 3 and 4 describe an all-solid-state lithium secondary battery having a solid electrolyte layer formed by a method for applying a solid electrolyte layer slurry composition containing solid electrolyte particles and a solvent onto a positive electrode or a negative electrode and drying the composition (application method). In a case where an electrode or an electrolyte layer is formed by the application method, the viscosity or the fluidity of a slurry composition containing an active material or an electrolyte needs to be within a range of conditions making application possible. On the other hand, it is important for an electrode and an electrolyte layer formed by applying a slurry composition and then drying a solvent to include an additive other than an active material and an electrolyte, such as a binder in order to exhibit a characteristic as a battery. Accordingly, Patent Literature 5 has proposed use of an acrylate-based polymer for a binder.

CITATION LIST

Patent Literature

Patent Literature 1: JP 4134617 B2
Patent Literature 2: JP 59-151770 A
Patent Literature 3: JP 2009-176484 A
Patent Literature 4: JP 2009-211950 A
Patent Literature 5: WO 2011/105574 A

SUMMARY OF INVENTION

Technical Problem

However, according to studies by the present inventor, all-solid-state lithium secondary batteries described in Patent Literatures 3 and 4 may have insufficient battery capacity characteristics or cycle characteristics due to insufficient ion conductivity in a solid electrolyte layer or an active material layer. In addition, Patent Literature 5 has proposed an all-solid-state secondary battery having excellent battery characteristics. However, a battery having higher characteristics is required.

An object of the present invention is to provide a binder for all-solid-state secondary batteries, capable of obtaining an all-solid-state secondary battery having good battery characteristics and an all-solid-state secondary battery using this binder for all-solid-state secondary batteries.

Solution to Problem

As a result of intensive studies, the present inventor has found that the above-described object can be achieved by using a binder containing a binder polymer obtained by polymerizing or copolymerizing a monomer composition containing a polyalkylene oxide-based monomer, and has completed the present invention.

That is, the present invention provides: (1) a binder for all-solid-state secondary batteries, containing a binder polymer obtained by polymerizing or copolymerizing a monomer composition containing a polyalkylene oxide-based monomer;

(2) the binder for all-solid-state secondary batteries according to (1), in which the binder polymer is formed of a binder composition obtained by exchanging a solvent of an aqueous dispersion containing the binder polymer for an organic solvent;

(3) the binder for all-solid-state secondary batteries according to (1) or (2), in which the monomer composition contains 1 to 50 wt % of the polyalkylene oxide-based monomer; and (4) an all-solid-state secondary battery including a positive electrode having a positive electrode active material layer, a negative electrode having a negative electrode active material layer, and a solid electrolyte layer disposed between the positive electrode active material layer and the negative electrode active material layer, in which the all-solid-state secondary battery is formed using the binder for all-solid-state secondary batteries according to any one of (1) to (3).

Advantageous Effects of Invention

The present invention can provide a binder for all-solid-state secondary batteries, capable of obtaining an all-solid-state secondary battery having good battery characteristics. In addition, the present invention can provide an all-solid-state secondary battery using this binder for all-solid-state secondary batteries.

DESCRIPTION OF EMBODIMENTS

Binder for All-Solid-State Secondary Batteries

The binder for all-solid-state secondary batteries of the present invention contains a binder polymer obtained by polymerizing or copolymerizing a monomer composition containing a polyalkylene oxide-based monomer. Here, the binder for all-solid-state secondary batteries (hereinafter, also referred to as "binder") is used, for example, for binding solid electrolyte particles to each other to form a solid electrolyte layer.

Examples of the polyalkylene oxide-based monomer include a (meth)acrylate of an alkylene oxide such as nonylphenol EO adduct acrylate, phenoxy-polyethylene glycol acrylate, phenoxydiethylene glycol acrylate, methoxy-dipropylene glycol acrylate, methoxy-polyethylene glycol acrylate, 2-ethylhexyl-diglycol acrylate, methoxy-triethylene glycol acrylate, ethoxy-diethylene glycol acrylate, methoxypolyethylene glycol methacrylate, ethoxypolyethylene glycol methacrylate, or butoxydiethylene glycol methacrylate; and an allyl ether such as polyethylene glycol allyl ether or methoxypolyethylene glycol allyl ether.

The number of repeating units of an alkylene oxide contained in the polyalkylene oxide-based monomer used in the present invention is preferably 3 or more, and more preferably 5 or more.

A content ratio of a monomer unit derived from a polyalkylene oxide-based monomer in the binder polymer used in the present invention is usually 1% by mass or more, and preferably 5% by mass or more. An upper limit of the content ratio of the monomer unit derived from the polyalkylene oxide-based monomer in the binder polymer is usually 50% by mass or less, preferably 30% by mass or less, and more preferably 20% by mass or less.

The binder polymer used in the present invention preferably contains a repeating unit (polymerization unit) obtained by polymerizing an acrylate or a methacrylate (hereinafter, also abbreviated as "(meth)acrylate"), or a derivative thereof from viewpoints of being able to increase a voltage resistance and being able to increase an energy density of an all-solid-state secondary battery.

Examples of the (meth)acrylate include an alkyl acrylate such as methyl acrylate, ethyl acrylate, n-propyl acrylate, isopropyl acrylate, n-butyl acrylate, t-butyl acrylate, 2-ethylhexyl acrylate, or benzyl acrylate; an alkoxyalkyl acrylate such as 2-methoxyethyl acrylate or 2-ethoxyethyl acrylate; a 2-(perfluoroalkyl) ethyl acrylate such as 2-(perfluorobutyl) ethyl acrylate or 2-(perfluoropentyl) ethyl acrylate; an alkyl methacrylate such as methyl methacrylate, ethyl methacrylate, n-propyl methacrylate, isopropyl methacrylate, n-butyl methacrylate, t-butyl methacrylate, 2-ethylhexyl methacrylate, lauryl methacrylate, tridecyl methacrylate, stearyl methacrylate, or benzyl methacrylate; and a 2-(perfluoroalkyl) ethyl methacrylate such as 2-(perfluorobutyl) ethyl methacrylate or 2-(perfluoropentyl) ethyl methacrylate. Among these (meth)acrylates, an alkyl acrylate such as methyl acrylate, ethyl acrylate, n-propyl acrylate, isopropyl acrylate, n-butyl acrylate, t-butyl acrylate, 2-ethylhexyl acrylate, or benzyl acrylate; and an alkoxyalkyl acrylate such as 2-methoxyethyl acrylate or 2-ethoxyethyl acrylate are preferable due to high adhesion to a solid electrolyte in the present invention.

A content ratio of a monomer unit derived from a (meth) acrylate in the binder polymer used in the present invention is usually 40% by mass or more, preferably 50% by mass or more, and more preferably 60% by mass or more. An upper limit of a content ratio of a monomer unit derived from a (meth) acrylate in the binder polymer is usually 99% by mass or less, and preferably 95% by mass or less.

In a case where the binder polymer contains a monomer unit derived from a (meth) acrylate, the (meth) acrylate may be copolymerized with a monomer copolymerizable with the (meth)acrylate. Examples of the copolymerizable monomer include a styrene-based monomer such as styrene, vinyltoluene, t-butylstyrene, vinylbenzoic acid, methyl vinylbenzoate, vinylnaphthalene, hydroxymethylstyrene, a-methylstyrene, or divinylbenzene; an amide-based monomer such as acrylamide, methacrylamide, N-methylol acrylamide, or acrylamide-2-methylpropanesulfonic acid; an $\alpha$, $\beta$-unsaturated nitrile compound such as acrylonitrile or methacrylonitrile; an olefin such as ethylene or propylene; a diene-based monomer such as butadiene or isoprene; a vinyl ester such as vinyl acetate, vinyl propionate, vinyl butyrate, or vinyl benzoate;

a vinyl ether such as methyl vinyl ether, ethyl vinyl ether, or butyl vinyl ether; a vinyl ketone such as methyl vinyl ketone, ethyl vinyl ketone, butyl vinyl ketone, hexyl vinyl ketone, or isopropenyl vinyl ketone; a heterocyclic ring-containing vinyl compound such as N-vinyl pyrrolidone, vinyl pyridine, or vinyl imidazole; and a silane such as vinyl dimethyl methoxysilane, vinyl trimethylsilane, divinyl dimethoxysilane, divinyl dimethylsilane, 1,3-divinyl-1,1,3,3-tetramethyldisiloxane, trivinyl methylsilane, tetravinylsilane, allyldimethyl methoxysilane, allyltrimethylsilane, diallyl dimethoxysilane, diallyl dimethylsilane, γ-methacryloyloxypropyl trimethoxysilane, or γ-methacryloyloxypropylmethyl dimethoxysilane. Among these monomers, a styrene-based monomer, an amide-based monomer, an $\alpha$, $\beta$-unsaturated nitrile compound, and a silane are preferable from a viewpoint of affinity for an organic solvent. A content ratio of the copolymerizable monomer in the binder polymer used in the present invention is usually 50% by mass or less, preferably 40% by mass or less, and more preferably 30% by mass or less.

In the present invention, in order to give a particle structure to the binder polymer contained in the binder, a compound generally capable of acting as a crosslinking agent or a monomer capable of forming a self-crosslinking structure may be copolymerized in polymer polymerization.

Examples of the compound capable of acting as a crosslinking agent (crosslinking agent) include a monomer having two or more double bonds. Examples thereof include a polyfunctional acrylate compound such as ethylene glycol dimethacrylate, diethylene glycol dimethacrylate, trimethylol propane triacrylate, polyethylene glycol diacrylate, polypropylene glycol diacrylate, trimethylol propane trimethacrylate, pentaerythritol tetraacrylate, or ethylene glycol dimethacrylate; and a polyfunctional aromatic compound such as divinylbenzene. A polyfunctional acrylate compound such as ethylene glycol dimethacrylate is preferable.

The use amount of a crosslinking agent depends on the type thereof, but is preferably 0.01 to 5 parts by mass, and more preferably 0.05 to 1 part by mass with respect to 100 parts by mass of the total amount of monomers.

Examples of the monomer easily forming a self-crosslinking structure include a diene-based monomer such as butadiene or isoprene; and an unsaturated nitrile compound such as acrylonitrile. Among these, a method of copolymerizing with acrylonitrile is preferable.

A method for manufacturing the binder polymer used in the present invention can be any one of polymerization methods in a dispersion system, such as a suspension polymerization method, a bulk polymerization method, and an emulsion polymerization method. The polymerization method may be any one of ion polymerization, radical polymerization, living radical polymerization, and the like.

Among these methods, the emulsion polymerization method is preferable because the binder polymer can be obtained as it is in a state of being dispersed in an aqueous solvent. Here, the aqueous solvent is a solvent containing water, and is preferably water because water is not combustible and makes it possible to easily obtain a dispersion of the above-described polymer.

Note that, water may be used as a main solvent and an aqueous solvent other than water may be mixed and used within a range which does not impair an effect of the present invention and can ensure a dispersion state of the above-described copolymer. Examples of the aqueous solvent other than water include a ketone, an alcohol, a glycol, a glycol ether, and an ether.

Note that, emulsion polymerization can be performed in accordance with a usual method. In emulsion polymerization, a polymerization auxiliary material usually used, such as an emulsifier, a polymerization initiator, a molecular weight regulator, or a chain transfer agent can be used.

As the emulsifier, any emulsifier can be used as long as a desired polymer can be obtained, and examples thereof include an anionic surfactant, a nonionic surfactant, a cationic surfactant, and an amphoteric surfactant. Among these emulsifiers, an anionic surfactant such as an alkylbenzene sulfonate, an aliphatic sulfonate, a sulfate of a higher alcohol, an a-olefin sulfonate, or an alkyl ether sulfate can be preferably used.

Any amount of the emulsifier can be used as long as a desired binder polymer can be obtained. The amount is preferably 0.5 parts by mass or more, more preferably 1 part by mass or more, preferably 10 parts by mass or less, and more preferably 5 parts by mass or less with respect to 100 parts by mass of a monomer composition.

Examples of a polymerization initiator used in polymerization include an organic peroxide such as lauroyl peroxide, diisopropyl peroxydicarbonate, di-2-ethylhexyl peroxydicarbonate, t-butyl peroxypivalate, or 3,3,5-trimethyl hexanoyl peroxide; an azo compound such as α,α'-azobisisobutyronitrile; ammonium persulfate; and potassium persulfate.

Note that, seed polymerization may be performed using seed particles in the polymerization. Polymerization conditions can also be arbitrarily selected depending on a polymerization method and the type of polymerization initiator. A content ratio of each monomer in the monomer composition used for preparation of the binder polymer can be determined according to a content ratio of each repeating unit in the binder polymer.

Binder Composition

The binder polymer used in the present invention is preferably formed of a binder composition obtained by exchanging a solvent of an aqueous dispersion containing the binder polymer obtained as described above for an organic solvent. This aqueous dispersion contains the binder polymer obtained above by polymerizing or copolymerizing a monomer composition containing a polyalkylene oxide-based monomer. The solvent of the aqueous mixture is an aqueous solvent such as water.

The solvent exchange can be performed by a known method. For example, an aqueous dispersion and an organic solvent are put in a rotary evaporator, and the solvent exchange and dehydration operation can be performed at a predetermined temperature under reduced pressure.

Note that, the solid content concentration of the binder composition used in the present invention is preferably 1 to 20 wt %. In addition, the amount of water contained in the binder composition used in the present invention is preferably less than 1000 ppm, more preferably less than 500 ppm, and still more preferably less than 100 ppm.

Organic Solvent

Examples of an organic solvent which can be used for solvent exchange include an organic solvent having a boiling point of 100° C. or higher. Preferable examples of the organic solvent having a boiling point of 100° C. or higher include an aromatic hydrocarbon such as toluene or xylene; an ether such as cyclopentyl methyl ether; and an ester such as butyl acetate. Xylene is more preferable. Note that these solvents can be used singly or in mixture of two or more types thereof.

All-Solid-State Secondary Battery

The all-solid-state secondary battery of the present invention includes a positive electrode having a positive electrode active material layer, a negative electrode having a negative electrode active material layer, and a solid electrolyte layer disposed between these positive and negative electrode active material layers, and further includes the above-described binder for all-solid-state secondary batteries in at least one of the positive electrode, the negative electrode, and the solid electrolyte layer. The positive electrode has the positive electrode active material layer on a current collector, and the negative electrode has the negative electrode active material layer on a current collector. Hereinafter, (1) the solid electrolyte layer, (2) the positive electrode active material layer, and (3) the negative electrode active material layer will be described in this order.

(1) Solid Electrolyte Layer

The solid electrolyte layer used in the present invention preferably contains a binder for all-solid-state secondary batteries, containing a binder polymer obtained by polymerizing or copolymerizing a monomer composition containing a polyalkylene oxide-based monomer.

The solid electrolyte layer is formed by applying a solid electrolyte layer slurry composition containing solid electrolyte particles and a binder for a solid electrolyte layer onto a positive electrode active material layer or a negative electrode active material layer described below, and drying the composition. The solid electrolyte layer slurry composition is manufactured by mixing solid electrolyte particles, a binder for a solid electrolyte layer, an organic solvent, and another component added as necessary.

Here, as the above-described binder for a solid electrolyte layer, the binder for all-solid-state secondary batteries of the present invention is preferably used.

Solid Electrolyte Particles

The solid electrolyte is used in a form of particles. Solid electrolyte particles which have been ground are used. Therefore, each of the solid electrolyte particles is not perfectly spherical but indefinite-form. In general, the size of a fine particle is measured by a method for measuring scattered light by irradiating a particle with a laser beam, for example. However, the particle diameter in this case is a value obtained by assuming that the shape of one particle is spherical. In a case where a plurality of particles is measured together, a presence ratio of particles having a corresponding particle diameter can be indicated as a particle size distribution. Solid electrolyte particles to form a solid electrolyte layer are often indicated by a value measured by this method as an average particle diameter.

In the solid electrolyte layer, it is effective for improving battery performance to reduce resistance of ion conduction. Ion conduction resistance of the solid electrolyte layer is largely influenced by particle diameters of the solid electrolyte particles. Generally, ion transfer resistance inside the solid electrolyte particles is smaller than transfer resistance between the particles. Thus, in the solid electrolyte particles, an average particle diameter of a predetermined value or less can suppress a phenomenon that a void inside the electrolyte layer becomes large, and as a result, an ion transfer resistance value increases. Furthermore, an average particle diameter of a predetermined value or more can avoid a problem that inter-particle resistance becomes too large or the viscosity of the solid electrolyte layer slurry composition becomes high, and as a result, it is difficult to control the thickness of the solid electrolyte layer. Accordingly, it is necessary to set the average particle diameter within an appropriate range. However, by controlling not only the average particle diameter but also a distribution state of the particle diameter within a specific range, battery performance is improved.

The average particle diameter of the solid electrolyte particles is preferably 0.1 to 10 μm. The average particle diameter of the solid electrolyte particles within the above-described range makes it possible to obtain a solid electrolyte layer slurry composition having excellent dispersibility and coatability.

The solid electrolyte particles are not particularly limited as long as having conductivity of a lithium ion, but preferably contain a crystalline inorganic lithium ion conductor or an amorphous inorganic lithium ion conductor.

Examples of the crystalline inorganic lithium ion conductor include $Li_3N$, LISICON ($Li_{14}Zn$ $(GeO_4)_4$), perovskite type $Li_{0.5}La_{0.5}TiO_3$, LIPON ($Li_{3+y}PO_{4-x}N_x$), and Thio-LISICON ($Li_{3.25}Ge_{0.25}P_{0.75}S_4$).

The amorphous inorganic lithium ion conductor is not particularly limited as long as containing S (sulfur atom) and having ion conductivity (sulfide solid electrolyte particle). Here, in a case where the all-solid-state secondary battery of the present invention is an all-solid-state lithium secondary battery, examples of a sulfide solid electrolyte material used include a material obtained by using a raw material composition containing $Li_2S$ and a sulfide of an element belonging to groups 13 to 15. Examples of a method for synthesizing a sulfide solid electrolyte material using such a raw material composition include an amorphization method. Examples of the amorphization method include a mechanical milling method and a melt quenching method, and the mechanical milling method is particularly preferable. This is because the mechanical milling method makes it possible to perform a treatment at normal temperature and to simplify a manufacturing process.

Examples of the above-described element belonging to groups 13 to 15 include Al, Si, Ge, P, As, and Sb. Specific examples of a sulfide of an element belonging to groups 13 to 15 include $Al_2S_3$, $SiS_2$, $GeS_2$, $P_2S_3$, $P_2S_5$, $As_2S_3$, and $Sb_2S_3$. Among these sulfides, a sulfide belonging to group 14 or 15 is preferably used in the present invention. Particularly, in the present invention, the sulfide solid electrolyte material obtained by using a raw material composition containing $Li_2S$ and a sulfide of an element belonging to groups 13 to 15 is preferably a $Li_2S$-$P_2S_5$ material, a $Li_2S$—$SiS_2$ material, a $Li_2S$—$GeS_2$ material, or a $Li_2S$—$Al_2S_3$ material, and more preferably a $Li_2S$—$P_2S_5$ material. This is because these materials have excellent Li ion conductivity.

In addition, the sulfide solid electrolyte material in the present invention preferably contains crosslinking sulfur. This is because inclusion of crosslinking sulfur increases ion conductivity. Furthermore, in a case where the sulfide solid electrolyte material contains crosslinking sulfur, usually, reactivity with a positive electrode active material is high, and a high resistance layer is easily generated. Note that "inclusion of crosslinking sulfur" can be determined, for example, by considering a measurement result of a Raman spectrum, a raw material composition ratio, and a measurement result of NMR.

The molar fraction of $Li_2S$ in a $Li_2S$—$P_2S_5$ material or a $Li_2S$—$Al_2S_3$ material is, for example, within a range of 50 to 74%, preferably within a range of 60 to 74% from a viewpoint of being able to obtain a sulfide solid electrolyte material containing crosslinking sulfur more surely.

The sulfide solid electrolyte material in the present invention may be sulfide glass or crystallized sulfide glass obtained by subjecting the sulfide glass to a heat treatment. The sulfide glass can be obtained by the above-described amorphization method, for example. The crystallized sulfide glass can be obtained by subjecting sulfide glass to a heat treatment, for example.

Particularly, in the present invention, the sulfide solid electrolyte material is preferably crystallized sulfide glass represented by $Li_7P_3S_{11}$. This is because the crystallized sulfide glass represented by $Li_7P_3S_{11}$ has particularly excellent Li ion conductivity. As a method for synthesizing $Li_7P_3S_{11}$, for example, $Li_2S$ and $P_2S_5$ are mixed at a molar ratio of 70:30, are amorphized with a ball mill to synthesize sulfide glass, and the obtained sulfide glass is subjected to a heat treatment at 150° C. to 360° C. to synthesize $Li_7P_3S_{11}$.

Organic Solvent

As the organic solvent for manufacturing the solid electrolyte layer slurry composition, those exemplified as the above-described organic solvent which can be used for solvent exchange can be used.

The content of an organic solvent in the solid electrolyte layer slurry composition is preferably 10 to 700 parts by mass, and more preferably 30 to 500 parts by mass with respect to 100 parts by mass of the solid electrolyte particles from a viewpoint of being able to obtain excellent coating characteristics while maintaining dispersibility of solid electrolyte particles in the solid electrolyte layer slurry composition.

The solid electrolyte layer slurry composition may contain a component having functions of a dispersant, a leveling agent, and an antifoaming agent as another component added as necessary in addition to the above-described components. The component is not particularly limited as long as having no influence on a battery reaction.

Dispersant

Examples of the dispersant include an anionic compound, a cationic compound, a nonionic compound, and a polymer compound. The dispersant is selected according to solid electrolyte particles used. The content of the dispersant in the solid electrolyte layer slurry composition is preferably within a range having no influence on battery characteristics, and is specifically 10 parts by mass or less with respect to 100 parts by mass of the solid electrolyte particles.

Leveling Agent

Examples of the leveling agent include a surfactant such as an alkyl-based surfactant, a silicone-based surfactant, a fluorine-based surfactant, or a metal-based surfactant. By mixing the above-described surfactant, it is possible to prevent repelling which occurs when the solid electrolyte layer slurry composition is applied onto a surface of a positive electrode active material layer or a negative electrode active material layer described below, and to improve smoothness of positive and negative electrodes. The content of the leveling agent in the solid electrolyte layer slurry composition is preferably within a range having no influence on battery characteristics, and is specifically 10 parts by mass or less with respect to 100 parts by mass of the solid electrolyte particles.

Antifoaming Agent

Examples of the antifoaming agent include a mineral oil-based antifoaming agent, a silicone-based antifoaming agent, and a polymer-based antifoaming agent. The antifoaming agent is selected according to solid electrolyte particles used. The content of the antifoaming agent in the solid electrolyte layer slurry composition is preferably within a range having no influence on battery characteristics, and is specifically 10 parts by mass or less with respect to 100 parts by mass of the solid electrolyte particles.

(2) Positive Electrode Active Material Layer

The positive electrode active material layer is formed by applying a positive electrode active material layer slurry composition containing a positive electrode active material, solid electrolyte particles, and a binder for a positive electrode onto a surface of a current collector described below, and drying the composition. The positive electrode active material layer slurry composition is manufactured by mixing a positive electrode active material, solid electrolyte particles, a binder for a positive electrode, an organic solvent, and another component added as necessary.

Positive Electrode Active Material

The positive electrode active material is a compound capable of occluding and releasing a lithium ion. The positive electrode active material is roughly classified into a material formed of an inorganic compound and a material formed of an organic compound.

Examples of the positive electrode active material formed of an inorganic compound include a transition metal oxide, a composite oxide of lithium and a transition metal, and a transition metal sulfide. Examples of the above-described transition metal include Fe, Co, Ni, and Mn. Specific examples of the inorganic compound used for the positive electrode active material include a lithium-containing composite metal oxide such as $LiCoO_2$, $LiNiO_2$, $LiMnO_2$, $LiMn_2O_4$, $LiFePO_4$, or $LiFeVO_4$; a transition metal sulfide such as $TiS_2$, $TiS_3$, or amorphous $MoS_2$; and a transition metal oxide such as $Cu_2V_2O_3$, amorphous $V_2O$—$P_2O_5$, $MoO_3$, $V_2O_5$, or $V_6O_{13}$. These compounds may have been subjected to partial element substitution.

Examples of the positive electrode active material formed of an organic compound include polyaniline, polypyrrole, polyacene, a disulfide-based compound, a polysulfide-based compound, and an N-fluoro pyridinium salt. The positive electrode active material may be a mixture of the above-described inorganic compound and organic compound.

The average particle diameter of the positive electrode active material used in the present invention is usually 0.1 to 50 μm, and preferably 1 to 20 μm from viewpoints of improving battery characteristics such as load characteristics or cycle characteristics, being able to obtain an all-solid-state secondary battery having large charge/discharge capacity, easy handling of a positive electrode active material layer slurry composition, and easy handling in manufacturing a positive electrode. The average particle diameter can be determined by measuring a particle size distribution by laser diffraction.

Solid Electrolyte Particles

As the solid electrolyte particles, those exemplified in the solid electrolyte layer can be used.

A weight ratio between the positive electrode active material and the solid electrolyte particles (positive electrode active material: solid electrolyte particles) is preferably 90:10 to 50:50, and more preferably 60:40 to 80:20. The weight ratio of the positive electrode active material within this range can suppress a phenomenon that the amount of the positive electrode active material in a battery is reduced because of a too small weight ratio of the positive electrode active material, leading to capacity reduction as a battery. Furthermore, the weight ratio of the solid electrolyte particles within this range can suppress a phenomenon that conductivity cannot be sufficiently obtained and the positive electrode active material cannot be used effectively because of a too small weight ratio of the solid electrolyte particles, leading to capacity reduction as a battery.

Binder for Positive Electrode

The binder for a positive electrode is not particularly limited, but the binder for all-solid-state secondary batteries of the present invention is preferably used.

The content of the binder for a positive electrode in the positive electrode active material layer slurry composition is preferably 0.1 to 5 parts by mass, and more preferably 0.2 to 4 parts by mass with respect to 100 parts by mass of the positive electrode active material from a viewpoint of being able to prevent a positive electrode active material from falling from an electrode without inhibiting a battery reaction.

As the organic solvent and another component added as necessary in the positive electrode active material layer slurry composition, similar compounds to those exemplified in the above solid electrolyte layer can be used. The content of the organic solvent in the positive electrode active material layer slurry composition is preferably 20 to 80 parts by mass, and more preferably 30 to 70 parts by mass with respect to 100 parts by mass of the positive electrode active material from a viewpoint of being able to obtain an excellent coating characteristic while maintaining dispersibility of a solid electrolyte.

The positive electrode active material layer slurry composition may contain an additive exhibiting various functions, such as a conductive agent or a reinforcing material as another component added as necessary in addition to the above-described components. The additive is not particularly limited as long as having no influence on a battery reaction.

Conductive Agent

The conductive agent is not particularly limited as long as being able to impart conductivity, but usual examples thereof include carbon powder such as acetylene black, carbon black, or graphite, and fibers and foils of various metals.

Reinforcing Material

As the reinforcing material, various inorganic and organic spherical, plate-shaped, rod-shaped, or fibrous fillers can be used.

(3) Negative Electrode Active Material Layer

The negative electrode active material layer contains a negative electrode active material.

Negative Electrode Active Material

Examples of the negative electrode active material include an allotrope of carbon, such as graphite or coke. The negative electrode active material formed of the above-described allotrope of carbon can be also used in a form of a mixture with a metal, a metal salt, an oxide, or the like, or a cover material. Examples of the negative electrode active material further include an oxide and a sulfate of silicon, tin, zinc, manganese, iron, or nickel, metallic lithium, a lithium alloy such as Li—Al, Li—Bi—Cd, or Li—Sn—Cd, a lithium transition metal nitride, and silicon. In a case of a metal material, a metal foil or a metal plate can be used as an electrode as it is, but the metal material may be used in a form of particles.

In this case, the negative electrode active material layer is formed by applying a negative electrode active material layer slurry composition containing a negative electrode active material, solid electrolyte particles, and a binder for a negative electrode onto a surface of a current collector described below, and drying the composition. The negative electrode active material layer slurry composition is manufactured by mixing a negative electrode active material, solid electrolyte particles, a binder for a negative electrode, an organic solvent, and another component added as necessary. Note that, as the solid electrolyte particles, the organic solvent, and another component added as necessary in the negative electrode active material layer slurry composition, similar compounds to those exemplified in the above-described positive electrode active material layer can be used.

In a case where the negative electrode active material is in a form of particles, the average particle diameter of the negative electrode active material is usually 1 to 50 μm, and preferably 15 to 30 μm from a viewpoint of improving battery characteristics such as an initial efficiency, load characteristics, or cycle characteristics.

A weight ratio between the negative electrode active material and the solid electrolyte particles (negative electrode active material: solid electrolyte particles) is preferably 90:10 to 50:50, and more preferably 60:40 to 80:20. The weight ratio of the negative electrode active material within this range can suppress a phenomenon that the amount of the negative electrode active material in a battery is reduced because of a too small weight ratio of the negative electrode active material, leading to capacity reduction as a battery. Furthermore, the weight ratio of the solid electrolyte particles within this range can suppress a phenomenon that conductivity cannot be sufficiently obtained and the negative electrode active material cannot be used effectively because of a too small weight ratio of the solid electrolyte particles, leading to capacity reduction as a battery.

Binder for Negative Electrode

The binder for a negative electrode is not particularly limited, but the binder for all-solid-state secondary batteries of the present invention is preferably used.

In a case where the negative electrode active material is in a form of particles, the content of the binder for a negative electrode in the negative electrode active material layer slurry composition is preferably 0.1 to 5 parts by mass, and more preferably 0.2 to 4 parts by mass with respect to 100 parts by mass of the negative electrode active material from a viewpoint of being able to prevent an electrode active material from falling from an electrode without inhibiting a battery reaction.

Current Collector

The current collector used for forming the positive electrode active material layer or the negative electrode active material layer is not particularly limited as long as being a material having electrical conductivity and electrochemical durability. However, for example, a metal material such as iron, copper, aluminum, nickel, stainless steel, titanium, tantalum, gold, or platinum is preferable from a viewpoint of heat resistance. Among the materials, aluminum is particularly preferable as a positive electrode, and copper is particularly preferable as a negative electrode. The shape of the current collector is not particularly limited, but a sheet-shaped current collector having a thickness of about 0.001 to 0.5 mm is preferable. The current collector is preferably subjected to a roughening treatment in advance to be used in order to enhance a bonding strength between the above-described positive and negative electrode active material layers. Examples of a roughening method include a mechanical polishing method, an electrolytic polishing method, and a chemical polishing method. In the mechanical polishing method, abrasive cloth and paper to which abrasive grains have been fixed, a grindstone, an emery wheel, a wire brush provided with a steel wire or the like, and the like are used. In addition, in order to enhance a bonding strength between the current collector and the positive and negative electrode active material layers and conductivity, an intermediate layer may be formed on a surface of the current collector.

Manufacture of Solid Electrolyte Layer Slurry Composition

The solid electrolyte layer slurry composition is obtained by mixing the above-described solid electrolyte particles, binder for a solid electrolyte layer, organic solvent, and another component added as necessary. Here, as the binder for a solid electrolyte layer, the binder for all-solid-state secondary batteries of the present invention is preferably used. As the binder for a solid electrolyte layer, the above-described binder composition is preferably added.

Manufacture of Positive Electrode Active Material Layer Slurry Composition

The positive electrode active material layer slurry composition is obtained by mixing the above-described positive electrode active material, solid electrolyte particles, binder for a positive electrode, organic solvent, and another component added as necessary. Here, as the binder for a positive electrode, the binder for all-solid-state secondary batteries of the present invention is preferably used. As the binder for a positive electrode, the above-described binder composition is preferably added.

Manufacture of Negative Electrode Active Material Layer Slurry Composition

The negative electrode active material layer slurry composition is obtained by mixing the above-described negative electrode active material, solid electrolyte particles, binder for a negative electrode, organic solvent, and another component added as necessary. Here, as the binder for a negative electrode, the binder for all-solid-state secondary batteries of the present invention is preferably used. As the binder for a negative electrode, the above-described binder composition is preferably added.

A method for mixing the above-described slurry composition is not particularly limited. However, examples thereof include a method using a mixing apparatus such as a stirring type apparatus, a shaking type apparatus, or a rotary type apparatus. Examples thereof further include a method using a dispersion kneading apparatus such as a homogenizer, a ball mill, a bead mill, a planetary mixer, a sand mill, a roll mill, or a planetary kneader. A method using a planetary mixer, a ball mill, or a bead mill is preferable from a viewpoint of being able to suppress aggregation of the solid electrolyte particles.

Note that, examples of the organic solvent which can be used for manufacturing the solid electrolyte layer slurry composition, the positive electrode active material layer slurry composition, and the negative electrode active material layer slurry composition include a cycloaliphatic hydrocarbon such as cyclopentane or cyclohexane; an aromatic hydrocarbon such as toluene or xylene; an ether such as dimethyl ether, methyl ethyl ether, diethyl ether, or cyclopentyl methyl ether; and an ester such as ethyl acetate or butyl acetate. These solvents can be appropriately selected to be used singly or in combination of two or more types thereof from a viewpoint of a drying speed and environment.

Manufacture of All-Solid-State Secondary Battery

A positive electrode in the all-solid-state secondary battery of the present invention is manufactured by forming a positive electrode active material layer by applying the above-described positive electrode active material layer slurry composition onto a current collector, and drying the composition. Further, in a case where a metal foil is used as a negative electrode in the all-solid-state secondary battery of the present invention, the metal foil can be used as it is. In a case where the negative electrode active material is in a form of particles, a negative electrode is manufactured by forming a negative electrode active material layer by applying the above-described negative electrode active material layer slurry composition onto a current collector different from the current collector of the positive electrode, and drying the composition. Subsequently, a solid electrolyte layer slurry composition is applied onto the formed positive electrode active material layer or negative electrode active material layer, and the composition is dried to form a solid electrolyte layer. Then, by bonding an electrode in which a solid electrolyte layer has not been formed to the above-described electrode in which a solid electrolyte layer has been formed, an all-solid-state secondary battery device is manufactured.

A method for applying a positive electrode active material layer slurry composition and a negative electrode active material layer slurry composition onto a current collector is not particularly limited, but examples thereof include a doctor blade method, a dip method, a reverse roll method, a direct roll method, a gravure method, an extrusion method, and a brush application method. The application amount is not particularly limited, but is such an amount that the thickness of an active material layer formed after an organic solvent is removed is usually 5 to 300 μm, and preferably 10 to 250 μm. A drying method is not particularly limited, but examples thereof include drying with warm air, hot air, or low humidity air, vacuum drying, and drying by irradiation with a (far) infrared ray or an electron beam. A drying condition is usually adjusted such that an organic solvent volatilizes as soon as possible within a speed range which does not cause cracking in an active material layer due to stress concentration and does not cause an active material layer to peel from a current collector. Furthermore, the dried electrode may be pressed to be stabilized. Examples of a press method include a mold press method and a calender press method, but are not limited thereto.

Drying is performed at a temperature at which an organic solvent volatilizes sufficiently. Specifically, the drying temperature is preferably 50 to 250° C., and more preferably 80 to 200° C. from a viewpoint of being able to form an excellent active material layer without causing thermal decomposition of binders for positive and negative electrodes. Drying time is not particularly limited, but drying is usually performed within a range of 10 to 60 minutes.

A method for applying a solid electrolyte layer slurry composition onto a positive electrode active material layer or a negative electrode active material layer is not particularly limited, but a method similar to the above-described method for applying a positive electrode active material layer slurry composition and a negative electrode active material layer slurry composition onto a current collector is used. However, a gravure method is preferable from a viewpoint of being able to form a thin film solid electrolyte layer. The application amount is not particularly limited, but is such an amount that the thickness of a solid electrolyte layer formed after an organic solvent is removed is preferably 2 to 30 μm. The thickness of the solid electrolyte layer within the above-described range can suppress a phenomenon that an all-solid-state secondary battery easily causes short-circuiting because of a too small thickness of the solid electrolyte layer. Furthermore, the thickness of the solid electrolyte layer within the above-described range can suppress a phenomenon that internal resistance of a battery increases because of a too large thickness of the solid electrolyte layer.

A drying method, a drying condition, and a drying temperature are similar to those for the above-described positive electrode active material layer slurry composition and negative electrode active material layer slurry composition.

Furthermore, the above-described laminate obtained by bonding an electrode in which a solid electrolyte layer has been formed to an electrode in which a solid electrolyte layer has not been formed may be pressurized. A pressurizing method is not particularly limited, but examples thereof include flat plate press, roll press, and cold isostatic press (CIP). The pressure for pressure press is preferably 5 to 700 MPa, and more preferably 7 to 500 MPa from a viewpoint of exhibiting excellent battery characteristics due to a low resistance at an interface between an electrode and a solid electrolyte layer, and a low contact resistance between particles in each layer. Note that a solid electrolyte layer and an active material layer may be compressed by press, and the thickness thereof may be smaller than that before press. In a case where press is performed, the thickness after press of each of the solid electrolyte layer and the active material layer in the present invention only needs to be in the above range.

It is not particularly limited whether a solid electrolyte layer slurry composition is applied onto a positive electrode active material layer or a negative electrode active material layer. However, the solid electrolyte layer slurry composition is preferably applied onto an active material layer having a larger particle diameter of an electrode active material to be used. When the particle diameter of an electrode active material is large, unevenness is formed on a surface of an active material layer. Therefore, by applying the slurry composition thereonto, the unevenness on the surface of the active material layer can be relieved. Accordingly, when lamination is performed by bonding an electrode in which a solid electrolyte layer has been formed to an electrode in which a solid electrolyte layer has not been formed, a contact area between the solid electrolyte layer and an electrode is increased, and an interface resistance can be reduced.

The obtained all-solid-state secondary battery device is left as it is, is wound, is bent, or the like in accordance with a battery shape, is put in a battery container, and is sealed to obtain an all-solid-state secondary battery. An expand metal, an overcurrent prevention device such as a fuse or a PTC device, a lead plate, or the like is put in the battery container as necessary, and thus an increase in pressure in the battery and overcharge/overdischarge can be prevented. The shape of a battery may be any one of a coin type, a button type, a sheet type, a cylinder type, a rectangular shape, and a flat type.

EXAMPLES

Hereinafter, the present invention will be described with reference to Examples, but the present invention is not limited in any way by these Examples. Characteristics are evaluated by the following methods. Note that "part" and "%" in these Examples mean "part by mass" and "% by mass", respectively, unless otherwise particularly specified. In Examples and Comparative Examples, measurement of the thickness of a solid electrolyte layer, measurement of a particle diameter, and measurement of battery characteristics were performed as follows.

Measurement of Thickness of Solid Electrolyte Layer

An all-solid-state secondary battery was pressed at a predetermined pressure, and then the thickness of an electrolyte layer was randomly measured at five points using a micrometer, and an average value thereof was calculated.

Measurement of Particle Diameter

In accordance with JIS Z8825-1:2001, a particle diameter was measured with a laser analysis apparatus (laser diffraction type particle size distribution measuring apparatus SALD-3100 manufactured by Shimadzu Corporation).

Battery Characteristic: Output Characteristic

In each of thermostatic chambers at 25° C. and 60° C., 5 cells of all-solid-state secondary batteries were charged to 4.3 V by a 0.1 C constant current method, and were then discharged to 3.0 V at 0.1 C to determine a 0.1 C discharge capacity a.

Thereafter, the 5 cells of all-solid-state secondary batteries were charged to 4.3 V at 0.1 C, and were then discharged to 3.0 V at 1 C to determine a 1 C discharge capacity b. An average value of the values for the 5 cells was used as a measurement value, and a capacity retention ratio represented by a ratio of electric capacity between the 1 C discharge capacity b and the 0.1 C discharge capacity a (b/a (%)) was determined. A larger value of the capacity retention ratio indicates better output characteristics.

Battery Characteristic: Charge/Discharge Cycle Characteristic

Each of the obtained all-solid-state secondary batteries was subjected to a charge/discharge cycle in which the all-solid-state secondary batteries were charged to 4.2 V at a constant current by a constant-current constant-voltage charging method of 1 C in a thermostatic chamber at 25° C., then charged at a constant voltage, and then discharged to 3.0 V at a constant current of 1 C. The charge/discharge cycle was performed up to 10 cycles. A ratio of a discharge capacity in the 10th cycle with respect to initial discharge capacity was determined as a capacity retention ratio. As this value is larger, a decrease in capacity due to repeated charge/discharge is less. That is, it is indicated that deterioration of an active material and a binder can be suppressed due to a small internal resistance, and charge/discharge cycle characteristics are excellent.

Example 1

Manufacture of Binder Polymer

Into a glass container with a stirrer, 55 parts of ethyl acrylate, 40 parts of butyl acrylate, 5 parts of methoxypolyethylene glycol methacrylate (9 repeating units of ethylene oxide), 1 part of ethylene glycol dimethacrylate as a cross-linking agent, 1 part of sodium dodecylbenzenesulfonate as an emulsifier, 150 parts of deionized water, and 0.5 parts of potassium persulfate as a polymerization initiator were put, and stirred sufficiently. Thereafter, the resulting mixture was heated to 70° C. and polymerization was started. When the polymerization conversion reached 96%, cooling was started, and the reaction was stopped to obtain an aqueous dispersion of a particulate polymer.

Subsequently, the pH of the obtained aqueous dispersion was adjusted to 7 using a 10 wt % NaOH aqueous solution.

The aqueous dispersion of the polymer having pH adjusted to 7 was subjected to a heating and depressurization treatment in order to remove an unreacted monomer. Thereafter, deionized water was added thereto to adjust the solid content concentration to 30 wt %. The average particle diameter was 380 nm.

Manufacture of Binder Composition

In order to exchange the solvent from water to an organic solvent, 500 g of xylene was added to 100 g of the polymer particle aqueous dispersion having a solid content concentration adjusted, and heating and distillation under reduced pressure was performed. In a stage in which xylene was added to the aqueous dispersion for solvent exchange, a transparent liquid and a white solid were present. However, the whole system after dehydration and solvent exchange became a translucent liquid.

Manufacture of Positive Electrode Active Material Layer Slurry Composition 100 parts of lithium cobaltate (average particle diameter: 11.5 μm) as a positive electrode active material, 20 parts of sulfide glass ($Li_2S/P_2S_5$=70 mol %/30 mol %, ratio of particles having a particle diameter of 0.1 μm or more and less than 1.0 μm: 35%, ratio of particles having a particle diameter of 1.0 μm or more and less than 20 μm: 65%, average particle diameter: 2.2 μm) constituted by $Li_2S$ and $P_2S_5$ as solid electrolyte particles, 13 parts of acetylene black as a conductive agent, and 2 parts in terms of a solid content of the above-described binder composition as a binder for a positive electrode were added. In addition, the solid content concentration was adjusted to 78% using xylene as an organic solvent. Thereafter, the resulting mixture was mixed using a planetary mixer for 60minutes. Furthermore, the solid content concentration was adjusted to 60% with xylene, and then the resulting mixture was mixed for 10 minutes to prepare a positive electrode active material layer slurry composition.

Manufacture of Negative Electrode Active Material Layer Slurry Composition 100 parts of graphite (average particle diameter: 20 μm) as a negative electrode active material, 30 parts of sulfide glass ($Li_2S/P_2S_5$=70 mol %/30 mol %, ratio of particles having a particle diameter of 0.1 μm or more and less than 1.0 μm: 35%, ratio of particles having a particle diameter of 1.0 μm or more and less than 20 μm: 65%, average particle diameter: 2.2 μm) constituted by $Li_2S$ and $P_2S_5$ as solid electrolyte particles, 2 parts in terms of a solid content of the above-described binder composition as a binder for a negative electrode were added. Furthermore, the solid content concentration was adjusted to 60% by adding xylene as an organic solvent. Thereafter, the resulting mixture was mixed using a planetary mixer to prepare a negative electrode active material layer slurry composition.

Manufacture of Solid Electrolyte Layer Slurry Composition 100 parts of sulfide glass ($Li_2S/P_2S_5$=70 mol %/30 mol %, ratio of particles having a particle diameter of 0.1 pm or more and less than 1.0 μm: 35%, ratio of particles having a particle diameter of 1.0 μm or more and less than 20 μm: 65%, average particle diameter: 2.2 μm) constituted by $Li_2S$ and $P_{2S5}$ as solid electrolyte particles, 50 parts of solid electrolyte having an average particle diameter of 5.1 μm (sulfide glass constituted by $Li_2S$ and $P_2S_5$), and 2 parts in terms of a solid content of the binder composition obtained above as a binder were added. Furthermore, the solid content concentration was adjusted to 50% by adding xylene as an organic solvent. Thereafter, the resulting mixture was mixed using a planetary mixer to prepare a solid electrolyte layer slurry composition.

Manufacture of All-Solid-State Secondary Battery

Using an aluminum foil having a thickness of 12 μm as a current collector for a positive electrode, the above-described positive electrode active material layer slurry composition was applied onto a surface of the current collector, and the composition was dried (80° C., 60 minutes) to form a positive electrode active material layer having a thickness of 30 μm. A positive electrode was thereby manufactured. Using a copper foil having a thickness of 18 pm as a current collector for a negative electrode, the above-described negative electrode active material layer slurry composition was applied onto a surface of the current collector, and the composition was dried (80° C., 60 minutes) to form a negative electrode active material layer having a thickness of 23 μm. A negative electrode was thereby manufactured.

Subsequently, the above-described solid electrolyte layer slurry composition was applied onto a surface of the above-described positive electrode active material layer, and the composition was dried (80° C., 60 minutes) to form a solid electrolyte layer having a thickness of 20 μm.

The solid electrolyte layer laminated on the surface of the positive electrode active material layer and the above-described negative electrode active material layer of the negative electrode were bonded to each other, and were pressed to obtain an all-solid-state secondary battery. The thickness of the all-solid-state secondary battery after press was 45 μm. Output characteristics and charge/discharge cycle characteristics were evaluated using this battery. Table 1 indicates results thereof.

Example 2

A binder polymer was manufactured by similar operation to Example 1 except that the amount of ethyl acrylate was changed to 45 parts, the amount of butyl acrylate was changed to 45 parts, and the amount of methoxypolyethylene glycol methacrylate (9 repeating units of ethylene oxide) was changed to 10 parts in manufacture of the binder polymer. An all-solid-state secondary battery was manufactured in a similar manner to Example 1 except that this binder polymer was used, and evaluation was performed. Table 1 indicates results thereof.

Example 3

A binder polymer was manufactured by similar operation to Example 1 except that the amount of ethyl acrylate was changed to 40 parts, the amount of butyl acrylate was changed to 44 parts, the type of methoxypolyethylene glycol methacrylate was changed to methoxypolyethylene glycol methacrylate having 13 repeating units of ethylene oxide, the amount of methoxypolyethylene glycol methacrylate was changed to 10 parts, 1 part of methoxydiethyleneglycol methacrylate and 5 parts of acrylonitrile were added, and ethylene glycol dimethacrylate as a crosslinking agent was not used in manufacture of the binder polymer. An all-solid-state secondary battery was manufactured in a similar manner to Example 1 except that this binder polymer was used, and evaluation was performed. Table 1 indicates results thereof.

Example 4

A binder polymer was manufactured by similar operation to Example 1 except that ethyl acrylate was not used, the amount of butyl acrylate was changed to 30 parts, the type of methoxypolyethylene glycol methacrylate was changed to methoxypolyethylene glycol methacrylate having 13 repeating units of ethylene oxide, the amount of methoxypolyethylene glycol methacrylate was changed to 10 parts, and 39 parts of 2-ethylhexyl acrylate and 10 parts of acrylonitrile were added in manufacture of the binder polymer. An all-solid-state secondary battery was manufactured in a similar manner to Example 1 except that this binder polymer was used, and evaluation was performed. Table 1 indicates results thereof.

Example 5

A binder polymer was manufactured by similar operation to Example 1 except that the amount of ethyl acrylate was changed to 35 parts, the amount of butyl acrylate was changed to 40 parts, the type of methoxypolyethylene glycol methacrylate was changed to methoxypolyethylene glycol methacrylate having 13 repeating units of ethylene oxide, the amount of methoxypolyethylene glycol methacrylate was changed to 20 parts, and 5 parts of acrylonitrile were added in manufacture of the binder polymer. An all-solid-state secondary battery was manufactured in a similar manner to Example 1 except that this binder polymer was used, and evaluation was performed. Table 1 indicates results thereof.

Comparative Example 1

A binder polymer was manufactured by similar operation to Example 1 except that methoxypolyethylene glycol methacrylate was not used, the amount of ethyl acrylate was changed to 45 parts, the amount of butyl acrylate was changed to 50 parts, 5 parts of methoxydiethylene glycol methacrylate were added, and ethylene glycol dimethacrylate as a crosslinking agent was not used in manufacture of the binder polymer. An all-solid-state secondary battery was manufactured in a similar manner to Example 1 except that this binder polymer was used, and evaluation was performed. Table 1 indicates results thereof.

Comparative Example 2

A binder polymer was manufactured by similar operation to Example 1 except that methoxypolyethylene glycol methacrylate was not used, the amount of ethyl acrylate was changed to 46 parts, the amount of butyl acrylate was changed to 50 parts, and 5 parts of ethylene glycol dimethacrylate as a crosslinking agent were added in manufacture of the binder polymer. An all-solid-state secondary battery was manufactured in a similar manner to Example 1 except that this binder polymer was used, and evaluation was performed. Table 1 indicates results thereof.

Comparative Example 3

A binder polymer was manufactured by similar operation to Example 1 except that methoxypolyethylene glycol methacrylate was not used, the amount of ethyl acrylate was changed to 45 parts, the amount of butyl acrylate was changed to 50 parts, and 5 parts of acrylonitrile and 1 part of ethylene glycol dimethacrylate as a crosslinking agent were added in manufacture of the binder polymer. An all-solid-state secondary battery was manufactured in a similar manner to Example 1 except that this binder polymer was used, and evaluation was performed. Table 1 indicates results thereof.

TABLE 1

| | Composition of binder polymer | | | | | | | Output characteristics Capacity retention ratio (%) | Charge/discharge cycle characteristics Capacity retention ratio (%) |
|---|---|---|---|---|---|---|---|---|---|
| | Ethyl acrylate (part) | Butyl acrylate (part) | 2-Ethylhexyl acrylate (part) | Methoxypolyethylene glycol methacrylate (part) | Methoxydiethylene glycol methacrylate (part) | Acrylonitrile (part) | Crosslinking agent (part) | | |
| Ex. 1 | 55 | 40 | 0 | 5 (n = 9) | — | 0 | 1 | 88 | 83 |
| Ex. 2 | 45 | 45 | 0 | 10 (n = 9) | — | 0 | 1 | 92 | 82 |
| Ex. 3 | 40 | 44 | 0 | 10 (n = 13) | 1 | 5 | 0 | 90 | 83 |
| Ex. 4 | 0 | 30 | 39 | 10 (n = 13) | — | 10 | 1 | 92 | 85 |
| Ex. 5 | 35 | 40 | 0 | 20 (n = 13) | — | 5 | 1 | 88 | 80 |
| Comp. Ex. 1 | 45 | 50 | 0 | 0 | 5 | 0 | 0 | 75 | 45 |
| Comp. Ex. 2 | 46 | 50 | 0 | 0 | — | 0 | 5 | 64 | 75 |
| Comp. Ex. 3 | 45 | 50 | 0 | 0 | — | 5 | 1 | 72 | 70 |

As indicated in Table 1, the all-solid-state secondary battery using a binder for all-solid-state secondary batteries, containing a binder polymer obtained by polymerizing or copolymerizing a monomer composition containing a polyalkylene oxide-based monomer had excellent output characteristics and charge/discharge cycle characteristics. It was indicated that a battery having good characteristics was obtained.

The invention claimed is:

1. A binder of all-solid-state secondary batteries, comprising a binder polymer obtained by copolymerizing a monomer composition containing 5% by mass or more to 20% by mass or less of a polyalkylene oxide-based monomer and 40% by mass or more of a (meth)acrylate, and
    wherein the binder polymer is a copolymer containing 5% by mass or more to 20% by mass or less of a polymerization unit of the polyalkylene oxide-based monomer and 40% by mass or more of a polymerization unit of the (meth)acrylate respectively, and
    the (meth)acrylate is at least one selected from an alkyl crylate, an alkoxy alkyl acrylate, a 2-(perfluoroalkyl) ethyl acrylate, an alkyl methacrylate, and a 2-(perfluoroalkyl) ethyl methacrylate.

2. The binder of all-solid-state secondary batteries according to claim 1, wherein the binder polymer is formed of a binder composition obtained by exchanging a solvent of an aqueous dispersion containing the binder polymer for an organic solvent.

3. An all-solid-state secondary battery comprising: a positive electrode having a positive electrode active material layer; a negative electrode having a negative electrode active material layer; and a solid electrolyte layer disposed between the positive electrode active material layer and the negative electrode active material layer, wherein the all-solid-state secondary battery is formed using the binder of all-solid-state secondary batteries according to claim 1.

* * * * *